United States Patent
Oh et al.

(10) Patent No.: US 6,266,050 B1
(45) Date of Patent: Jul. 24, 2001

(54) PORTABLE COMPUTER HAVING TOUCH PAD INPUT CONTROL FUNCTION

(75) Inventors: Jae-Choeul Oh, Suwon; Chong-Yok Park, Kumi, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/131,277

(22) Filed: Aug. 10, 1998

(30) Foreign Application Priority Data

Aug. 8, 1997 (KR) .................................................. 97-38021

(51) Int. Cl.[7] ............................. G06F 3/033; G06K 11/06
(52) U.S. Cl. ......................................... 345/173; 178/18.01
(58) Field of Search ..................................... 345/156, 157, 345/162, 168, 169, 172, 173, 174; 178/18.01, 18.03, 18.07, 20.01, 20.02

(56) References Cited

U.S. PATENT DOCUMENTS

| | | | |
|---|---|---|---|
| 4,121,204 | * 10/1978 | Welch et al. ........................ | 345/174 |
| 4,204,204 | * 5/1980 | Pitstick ................................ | 345/173 |
| 4,389,711 | * 6/1983 | Hotta et al. ......................... | 713/300 |
| 4,899,138 | 2/1990 | Araki et al. ......................... | 340/712 |
| 5,327,161 | 7/1994 | Logan et al. ........................ | 345/157 |
| 5,404,458 | 4/1995 | Zetts ................................... | 395/275 |
| 5,448,262 | * 9/1995 | Lee et al. ............................ | 345/212 |
| 5,568,604 | * 10/1996 | Hansen ............................... | 395/340 |
| 5,570,113 | * 10/1996 | Zetts ................................... | 345/173 |
| 5,666,113 | 9/1997 | Logan ................................. | 341/34 |
| 5,764,218 | 6/1998 | Bona et al. ......................... | 345/157 |
| 5,933,134 | * 8/1999 | Shieh .................................. | 345/173 |
| 6,057,830 | * 5/2000 | Chan et al. ......................... | 345/157 |

* cited by examiner

Primary Examiner—Bipin Shalwala
Assistant Examiner—Jeff Piziali
(74) Attorney, Agent, or Firm—Robert E. Bushnell, Esq.

(57) ABSTRACT

A portable computer having a touch pad as the pointing device adopts a touch pad input control function in accordance with the principles of the present invention. The portable computer system is provided with an input device interface for receiving pointing data generated in the touch pad and for detecting a quantity of time elapsing between occurrence of the pointing data. When the quantity of time exceeds a preset value, the input device interface disables input of the pointing data from the touch pad. The input operation of the pointing data is resumed when pointing data corresponding to a predetermined pattern is inputted. Preferably, the predetermined pattern corresponds to a closed curve which disregards the area and curvature of the closed curve. According to the principles of the present invention, unnecessary pointing operations which occur during inadvertent touches of the touch pad can be effectively prevented.

36 Claims, 5 Drawing Sheets

PORTABLE COMPUTER HAVING TOUCH PAD INPUT CONTROL FUNCTION

CLAIM OF PRIORITY

This application makes reference to, incorporates the same herein, and claims all benefits accruing under 35 U.S.C. § 119 from an application entitled a Portable Computer Having Touch Pad Input Control Function earlier filed in the Korean Industrial Property Office on the 8th day of August 1997, and there duly assigned Ser. No. 97-38021, a copy of which is annexed hereto.

BACKGROUND OF THE INVENTION

1. Technical Field

The present invention relates to portable computers, and more particularly to a portable computer having a touch pad input device in which inadvertent operation of the touch pad can be prevented during keyboard input operation.

2. Related Art

Computer systems are information handling systems that are utilized by many individuals and businesses today. A conventional computer system can be defined as a microcomputer that includes a central processing unit (CPU), a volatile memory, a non-volatile memory, a display monitor, a keyboard, an input device for cursor control such as a mouse, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

Portable computers are often referred to as laptop, notebook, or sub notebook computers. These computers typically incorporate a flat panel display such as a liquid crystal display (LCD) or other relatively small display. Typically, portable computers are equipped with pointing devices for enabling input of coordinate data, selection of a menu, moving of an object, and so forth. Examples of pointing devices include a mouse, a track ball, a stylus, a touch pad, and others. The typical pointing device of the portable computer may include a track ball, track point, and touch pad. These portable computer pointing devices are incorporated into the main body of the portable computer for their compact fit for the smaller size of the portable computer. Also, buttons are provided onto the surface of the main body to be pressed or clicked manually and to control certain functions that may be customized to suit the user.

Modern notebook computers often adopt the touch pad for its flat and compact structure. The touch pad is usually mounted in the midst of palm rest portion of the notebook computer, and in particular placed below "space" bar of the keyboard. Moving the mouse pointer is possible by moving a finger on the touch pad, and clicking operation can be made by touching a finger onto the touch pad.

However, during the keyboard input operation, problems arise in such a touch pad pointing device that the pointing operation can be made inadvertently by the movement of fingers. Particularly, thumbs are apt to be touched at the touch pad unconsciously since the touch pad is located adjacent the thumb position of the keyboard. In this case, an insertion point can be moved to wrong position on screen and one may make an error in key input in an application program such as a word processor program.

Attempts have been made to avoid inadvertent operation of the touch pad by adjusting the touch pad size or by changing the location of the touch pad. I believe these attempts have been unsuccessful because the inadvertent operation of the touch pad still occurs. In addition, these attempts have created design problems because the location of the touch pad and the size of the touch pad can limit design options of portable computers.

Exemplars of recent efforts in the art include U.S. Pat. No. 5,666,113 for a System for Using a Touchpad Input Device for Cursor Control and Keyboard Emulation issued to Logan, U.S. Pat. No. 4,899,138 for a Touch Panel Control Device with Touch Time and Finger Direction Discrimination issued to Araki et al., U.S. Pat. No. 5,404,458 for a Method and Apparatus Recognizing the Cessation of Motion of a Pointing Device on a Displays by Comparing a Group of Signals to an Anchor Point issued to Zetts, U.S. Pat. No. 5,327,161 for a System and Method for Emulating a Mouse Input Device with a Touchpad Input Device issued to Logan et al., and U.S. Pat. No. 5,764,218 for a Method and Apparatus for Contacting a Touch-sensitive Cursor-controlling Input Device to Generate Button Values issued to Della Bona et al.

Although various types of touch pads for computers currently exist, I have discovered that there is a need to provide an improved touch pad input control function for a portable computer.

SUMMARY OF THE INVENTION

The present invention is intended to solve the problems of the related art, and it is therefore an object of the invention to provide a portable computer having a touch pad input control function which can prevent pointing/click input of the touch pad by an inadvertent touch during the keyboard input operation.

In accordance with the principles of the present invention, there is provided in a portable computer system an input device interface receiving pointing data generated in a touch pad and counting time between occurrences of pointing data. When the time count exceeds a preset value, the input device interface disables input of the pointing data from the touch pad. The input operation of the pointing data is resumed when a series of pointing data corresponding to a predetermined pattern have been inputted. Preferably, the predetermined pattern is set by a closed curve which is irrespective of the area and curvature. According to this invention, unnecessary pointing operation by an inadvertent touch of the touch pad is effectively prevented.

To achieve these and other objects in accordance with the principles of the present invention, as embodied and broadly described, the present invention provides an apparatus operating a touch-sensitive touch pad unit coupled to a computer system, the apparatus comprising: a touch pad unit being coupled to a computer system, said touch pad unit generating first, second, and third pointer data respectively corresponding to a first, a second, and a third touching of said touch pad unit, each one of said touchings having a beginning and an end; an interface unit being coupled to said touch pad unit, receiving said first, second, and third pointer data from said touch pad unit, transmitting a first control signal corresponding to said first pointer data from said interface unit, detecting a first quantity of time corresponding to time elapsing after said end of said first touching, not transmitting a second control signal corresponding to said second pointer data from said interface unit when said first quantity of time exceeds a predetermined quantity of time; and a central processing unit being coupled to said interface unit, receiving said first control signal from said interface unit, and transforming said first control signal to a pointer to be displayed at a first position on a monitor coupled to said computer system, said first position on said monitor corresponding to said first control signal.

To achieve these and other objects in accordance with the principles of the present invention, as embodied and broadly described, the present invention provides an apparatus controlling a touch-sensitive touch pad unit coupled to a computer system, the apparatus comprising: a touch pad unit being coupled to a computer system, generating first and second pointer data respectively corresponding to a first and second touching of said touch pad unit, and transmitting said first and second pointer data, said second touching beginning after said first touching ends; an interface unit being coupled to said touch pad unit, receiving said first pointer data, transmitting a first control signal corresponding to said first pointer data, detecting a first quantity of time elapsing after said first touching ends, transmitting a second control signal corresponding to said second pointer data when said first quantity of time does not exceed a predetermined quantity of time, and not transmitting said second control signal when said first quantity of time does exceed said predetermined quantity of time; and a central processing unit being coupled to said interface unit and receiving said first control signal from said interface unit and transforming said first control signal to a pointer to be displayed at a first position on a monitor coupled to said computer system, said first position on said monitor corresponding to said first control signal.

To achieve these and other objects in accordance with the principles of the present invention, as embodied and broadly described, the present invention provides an apparatus operating a touch-sensitive touch pad unit coupled to a computer system, the apparatus comprising: a touch pad unit being coupled to a computer system, said touch pad unit generating first, second, and third pointer data respectively corresponding to a first, a second, and a third touching of said touch pad unit, each one of said touchings having a beginning and an end; a switch being coupled to said touch pad unit and also to a local reference potential, controlling a transmission of said first, second, and third pointer data to said local reference potential, said switch having a first position causing said first, second, and third pointer data to be transmitted to said local reference potential, and said switch having a second position causing said first, second, and third pointer data to not be transmitted to said local reference potential; an interface unit being coupled to said touch pad unit, receiving said first, second, and third pointer data from said touch pad unit when said switch is in said second position, transmitting a first control signal corresponding to said first pointer data from said interface unit, detecting a first quantity of time corresponding to time elapsing after said end of said first touching, not transmitting a second control signal corresponding to said second pointer data from said interface unit when said first quantity of time exceeds a predetermined quantity of time; and a central processing unit being coupled to said interface unit, receiving said first control signal from said interface unit, and transforming said first control signal to a pointer to be displayed at a first position on a monitor coupled to said computer system, said first position on said monitor corresponding to said first control signal.

To achieve these and other objects in accordance with the principles of the present invention, as embodied and broadly described, the present invention provides a method of controlling a touch-sensitive touch pad unit coupled to a computer system, comprising the steps of: detecting whether pointer data is generated by a touch pad unit after a predetermined quantity of time has elapsed, said pointer data being generated by said touch pad unit when a user performs a second touching of said touch pad unit, said touch pad unit being coupled to a computer system, and said touch pad unit enabling a user to control a pointer displayed on a monitor coupled to said computer system, measurement of said predetermined quantity of time starting when a first touching of said touchpad unit ends; when said pointer data is generated by said touch pad unit before said predetermined quantity of time has elapsed, transmitting a control signal corresponding to said pointer data; when said pointer data is generated by said touch pad unit after said predetermined quantity of time has elapsed, not transmitting said control signal corresponding to said pointer data; detecting when said pointer data corresponds to predetermined pointer data; and when said pointer data is generated by said touch pad unit after said predetermined quantity of time has elapsed and said pointer data corresponds to said predetermined pointer data, transmitting said control signal corresponding to said pointer data.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
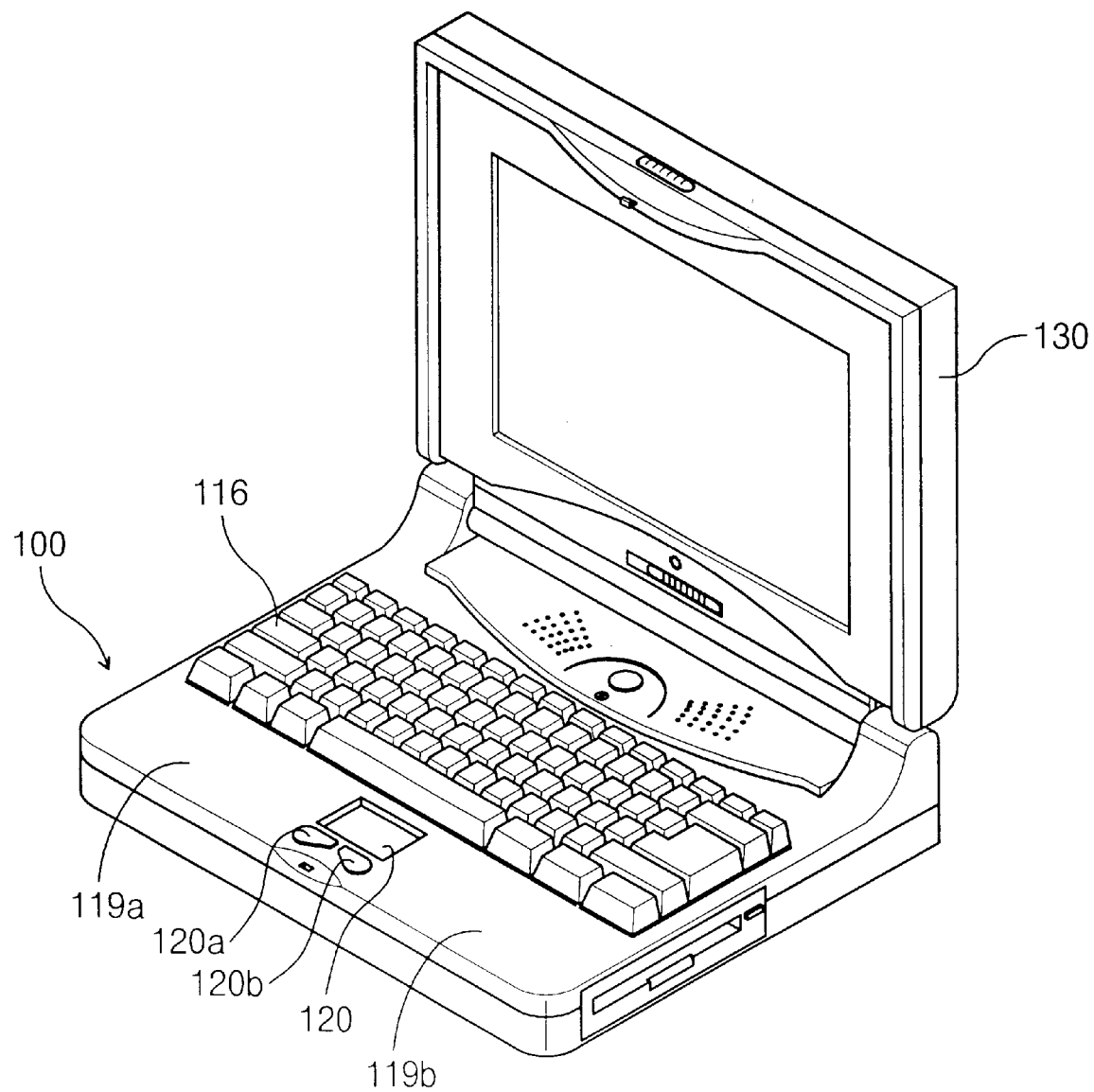
FIG. 1 illustrates a portable computer including a touch pad as a pointing device, in accordance with the principles of the present invention.

Refer now to FIG. 1, which illustrates a portable computer including a touch pad as a pointing device, in accordance with the principles of the present invention. In FIG. 1, there is shown a notebook computer which employs a touch pad as the pointing device in accordance with the present invention. As shown, the notebook computer includes a keyboard 116 provided at top portion of the main body 100. Also, a touch pad 120 is mounted at top surface 119a of the main body 100, below the keyboard 116. In the vicinity of the base of the touch pad 120, two mouse buttons 120a, 120b are provided to be pressed or clicked. Left and right sides 119a, 119b of the touch pad 120 forms a palm rest. A display unit 130 is hingedly mounted at rear side of the main body 100.

The touch pad 120 enables an inputting of coordinate data and a performing of various functions supported by related touch pad driver programs installed in the computer. A cursor or pointer is generated and it is presented on the screen of the display 130. As a finger moves on the touch pad, the pointer is moved and indicates a position on screen of display 130 where characters are to be inserted or where a selection is made.

Figure 2:
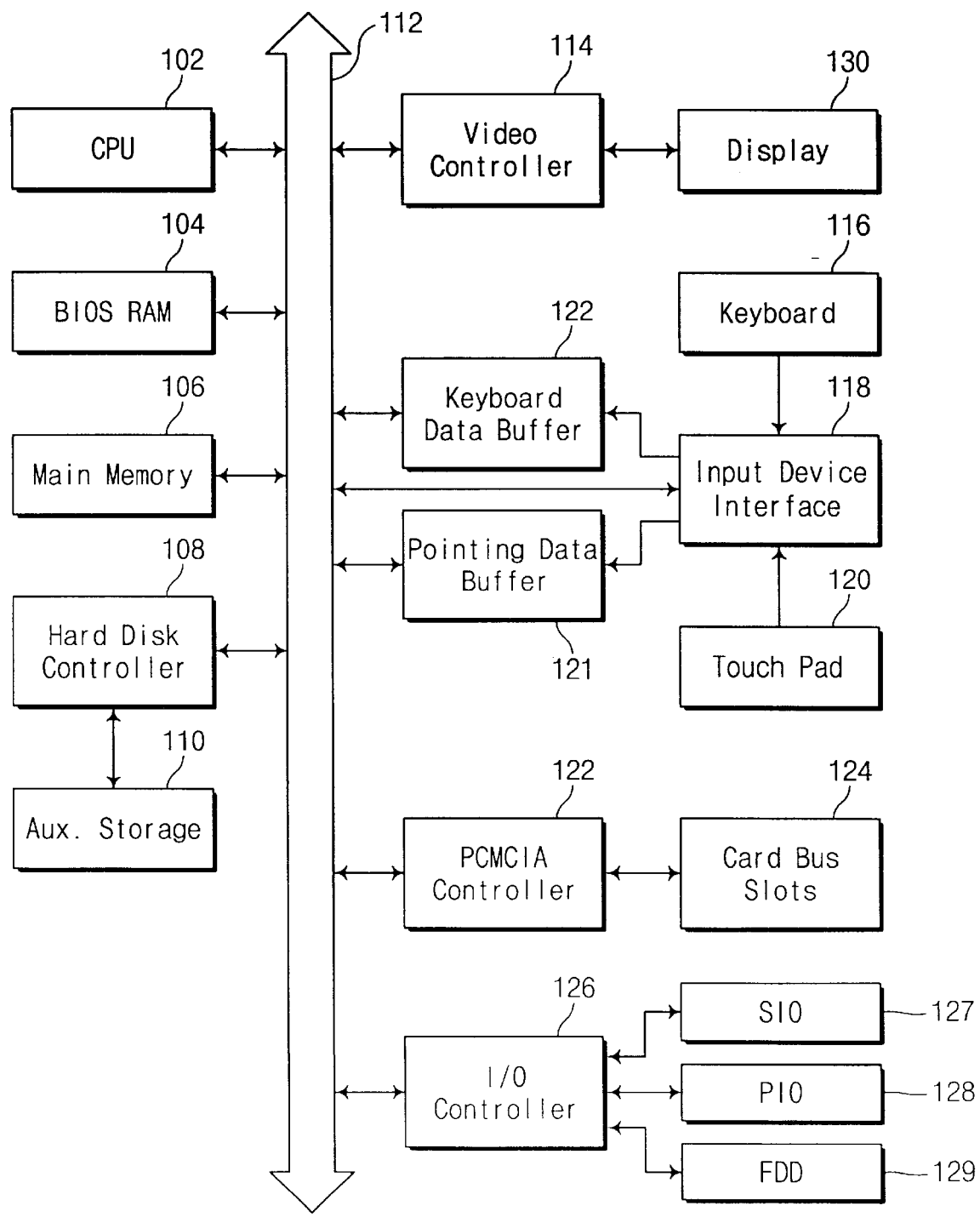
FIG. 2 illustrates a block diagram of the portable computer of FIG. 1, including a touch pad input control function, in accordance with the principles of the present invention.

Refer now to FIG. 2, which illustrates a block diagram of the portable computer of FIG. 1, including a touch pad input control function, in accordance with the principles of the present invention. FIG. 2 shows a configuration of the notebook computer system adopting a touch pad input control function in accordance with the invention. The computer system includes a central processing unit (CPU) 102, a basic input output system-random access memory (BIOS RAM) 104, a main memory 106, an auxiliary storage 110, a display unit 130, a keyboard 116, a touch pad 120, card bus slots 124, a serial port 127, a parallel port 128, and a floppy disk drive (FDD) 129. Further, a hard disk controller 108, a video controller 114, an input device interface 118, a personal computer memory card industry association (PCMCIA) controller 122, and an input/output controller 126 are provided to interface peripheral devices with the system buses 112. The input device interface 118 includes a keyboard data buffer 122 and a pointing data buffer 121 connected between the outputs of the input device interface 118 and the system buses 112.

The input device interface 118 is called a scan controller and consists of a microprocessor having a programmable read only memory (PROM) that stores firmware controlling input of the pointing data generated in the touch pad 120 in accordance with the invention. The control program will be described later with reference to FIG. 3. The input device interface 118 is also coupled to the system bus 112. The inputs of the input device interface 118 are connected with outputs of the keyboard 116 and the touch pad 120.

In this computer system, the touch pad 120 senses position of a finger touched at the pad thereof and outputs two dimensional coordinate data or pointing data to the input device interface 118. Also, the keyboard 116 responds to key input and outputs the corresponding key scan codes to the input device interface 118. The input device interface 118 converts the pointing data fed from the touch pad 120 into mouse system code and supplies it to the pointing data buffer 121. Similarly, the key scan code fed from the keyboard 116 is converted into keyboard system code and supplied to the keyboard data buffer 122. The pointing data buffer 121 and keyboard data buffer 122 have FIFO (first-in-first-out) structures, such that the first data received in corresponds to the first data transmitted out.

The central processing unit (CPU) 102 reads out the mouse system code and keyboard system code from the pointing data buffer 121 and keyboard data buffer 122, respectively, via the system bus 112. Each system code is transformed to a pointer or character and it is presented at the designated position on the screen of the display 130.

Figure 3:
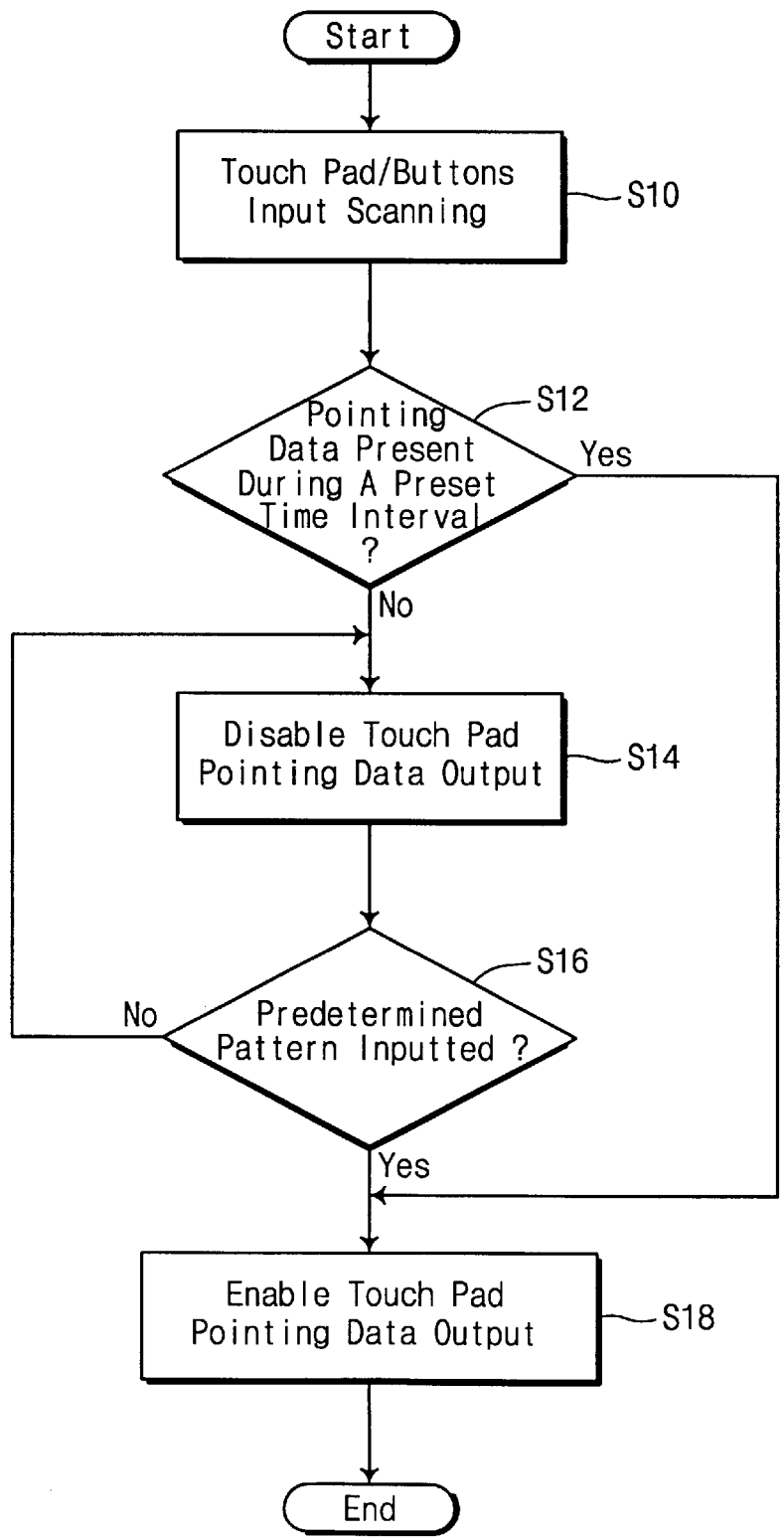
FIG. 3 illustrates a flowchart depicting a touch pad input control operation, in accordance with the principles of the present invention.

Refer now to FIG. 3, which illustrates a flowchart depicting a touch pad input control operation, in accordance with the principles of the present invention. The input device interface 118 performs the pointing data input control function in accordance with one embodiment of the invention. The touch pad input control operation is shown in the flowchart of FIG. 3. At step S10, a portable computer having a touch pad 120 is activated and a touch pad/buttons input scanning operation is carried out. At step S12, a determination is made whether pointing data from the touch pad 120 is inputted during a preset time interval. In step S12, the input device interface 118 uses a timer to detect a quantity of time during which the touch pad 120 has not been used. Step S14 is performed when no pointer data is input from the touch pad 120 during the preset time interval. At step S14, when the preset time interval has lapsed from the last pointing data input, the input device interface 118 disables input of the pointing data from the touch pad 120. One example of the preset time interval is three seconds.

When step S14 is performed, pointing data fed from the touch pad 120 cannot be converted into mouse system code, and also a storing of the system code in the pointing data buffer 121 is interrupted. Thus, the scan data from the touch pad 120 is not transferred to the central processing unit (CPU) 102, and any pointing data/button input occurring from the touch pad 120 will be disregarded. However, the keyboard system code from the keyboard data buffer 122 continues to be handled by the central processing unit (CPU) 102. Therefore, on condition that the touch pad 120 is not used for the preset time interval and then the key input from the keyboard 116 is continued, it is possible that the pointing data is prevented from being inputted to the computer system during the keyboard input operation, regardless of the number of touches at the touch pad 120.

At step S16, the input device interface 118 determines whether a series of pointing data corresponding to a predetermined pattern have been inputted. Preferably, the predetermined pattern is set to be a closed curve that disregards area and curvature. At step S18, when a closed curve is drawn on the touch pad, and the corresponding pointing data have been inputted, the input device interface 118 enables input of the pointing data from the touch pad 120. This allows transfer of the touch pad scan data to the central processing unit (CPU) 102. Thus, after step S18, normal pointing input operation of the touch pad can be resumed.

Figure 4:
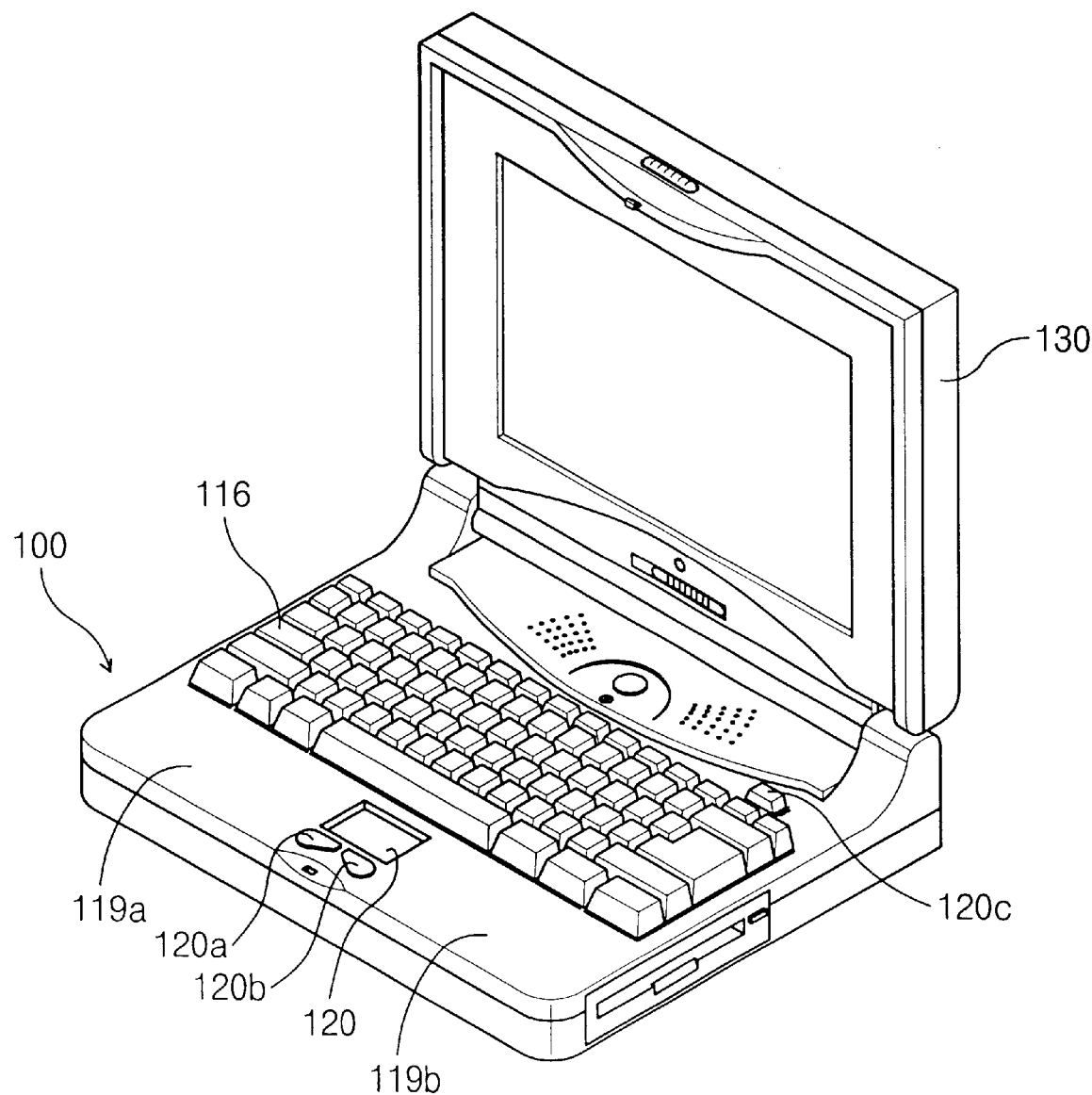
FIG. 4 illustrates a portable computer having a special key for disabling/enabling input of a touch pad, in accordance with the principles of the present invention.

Refer now to FIG. 4, which illustrates a portable computer having a special key for disabling/enabling input of a touch pad, in accordance with the principles of the present invention. The pointing data input control function can be performed through a special key operation in accordance with another embodiment of the invention. As shown in FIG. 4, a special key 120c is provided at top side portion of the keyboard 116. The key 120c may be designated by one of the general function keys to be operated in combination with a special function key. This key 120c is used when disabling of the touch pad is needed, such as when continuous key input operation is performed.

Figure 5:
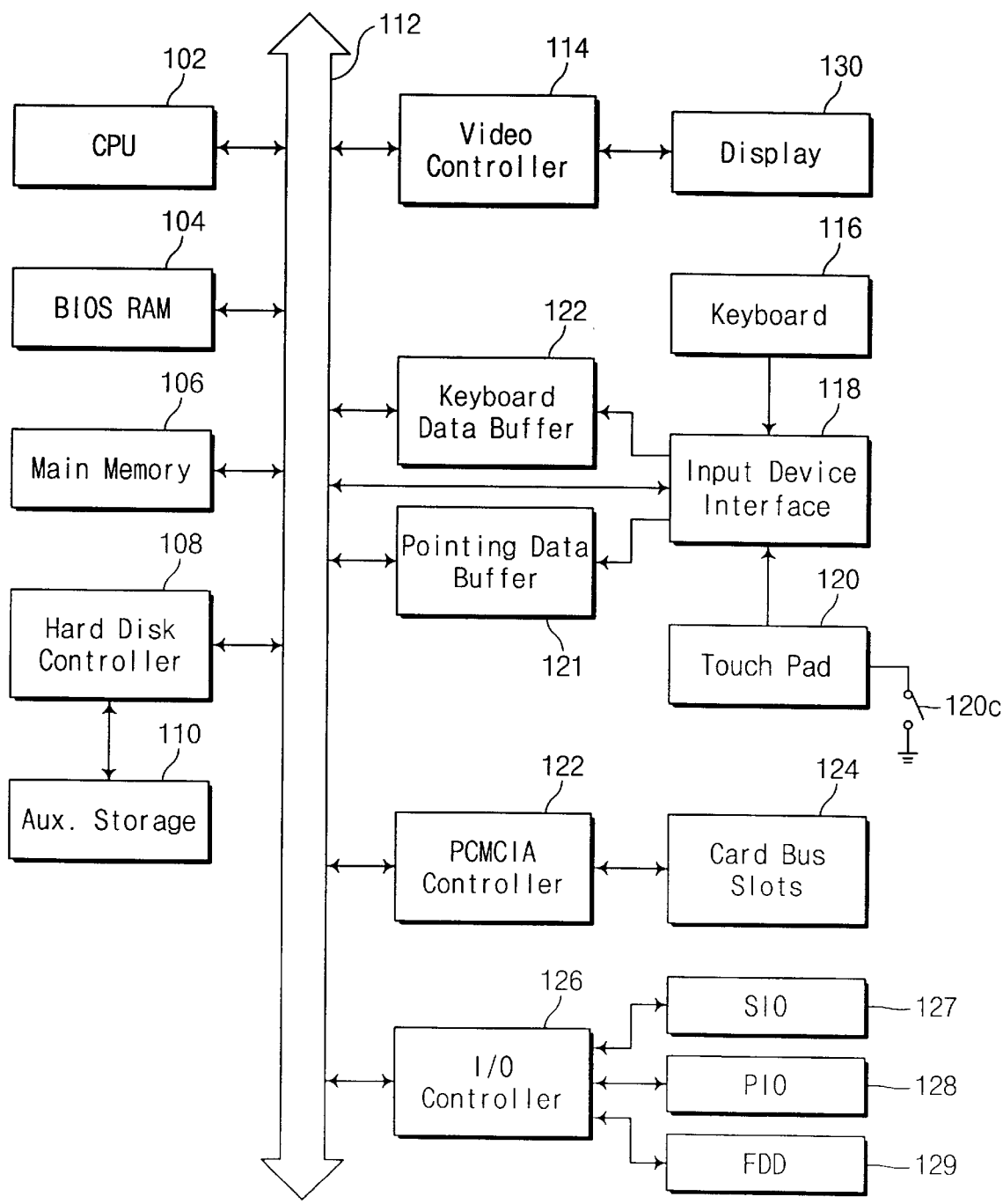
FIG. 5 illustrates a block diagram of the portable computer of FIG. 4, in accordance with the principles of the present invention.

Refer now to FIG. 5, which illustrates a block diagram of the portable computer of FIG. 4, in accordance with the principles of the present invention. Referring to FIG. 5, there is shown a configuration of a notebook computer which adopts the touch pad disabling/enabling key 120c of FIG. 4. The key switch 120c is connected with the touch pad 120 in order to bypass pointing data generated in the touch pad 120 to a ground or a local reference potential. When continuous keyboard input operation is needed, the computer user may press the key 120c to disable input of the pointing data from the touch pad 120. This also prevents the pointing data from being inputted to the input device interface 118 during the keyboard input operation, regardless of the number of touch at the touch pad 120. Further, when the pointing operation is needed, one may press again the key switch 120c to enable the touch pad operation.

As apparent from foregoing description, since the pointing data input function of the touch pad is disabled by either lapsing a preset time interval from the last input or pressing a special key, preventing unnecessary pointing operation by an inadvertent touch of the touch pad is possible. Further, since a closed curve is designated as an input pattern for resuming touch pad pointing operation, it is possible to reduce error rate of the input pattern effectively. Also, the present invention provides for versatility in designing a notebook computer adopting a touch pad. The limitation of placing a touch pad in the notebook computer can be relieved. Further, it is convenient for the user to disable/enable the touch pad since the mode changing operation can be made within a radius of keyboard input operation.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus operating a touch-sensitive touchpad unit coupled to a computer system, the apparatus comprising:
    a touch pad unit being coupled to a computer system, said touchpad unit generating first, second, and third pointer data respectively corresponding to a first, a second, and a third touching of said touch pad unit, each one of said touchings having a beginning and an end;
    an interface unit being coupled to said touch pad unit, receiving said first, second, and third pointer data from said touch pad unit, transmitting a first control signal corresponding to said first pointer data from said interface unit, detecting a first quantity of time corresponding to time elapsing after said end of said first touching, not transmitting a second control signal corresponding to said second pointer data from said interface unit when said first quantity of time exceeds a predetermined quantity of time; and
    a central processing unit being coupled to said interface unit, receiving said first control signal from said interface unit, and transforming said first control signal to a pointer to be displayed at a first position on a monitor coupled to said computer system, said first position on said monitor corresponding to said first control signal.

2. The apparatus of claim 1, wherein said interface unit further comprises a microprocessor and a memory storing a control routine controlling said transmitting of said first control signal.

3. The apparatus of claim 1, wherein said interface unit further comprises a pointer data buffer coupled between an output terminal of said interface unit and an input terminal of said central processing unit, said pointer data buffer storing said first control signal received from said output terminal of said interface unit.

4. The apparatus of claim 3, wherein said pointer data buffer operates in accordance with a first-in-first-out sequential structure of processing control data, said first control signal being received by said pointer data buffer from said output terminal of said interface unit prior to said third control signal being received by said pointer data buffer from said output terminal of said interface unit, and said first control signal being transmitted to said central processing unit prior to said third control signal being transmitted to said central processing unit, said control data corresponding to said first and third control signals transmitted from said output terminal of said interface unit.

5. The apparatus of claim 1, wherein said predetermined quantity of time corresponds to three seconds.

6. The apparatus of claim 1, wherein said interface unit transmits said third control signal from said interface unit to said central processing unit when said first quantity of time exceeds said predetermined quantity of time and said third pointer data corresponds to predetermined pointer data.

7. The apparatus of claim 6, wherein said predetermined pointer data corresponds to a predetermined touching of said touch pad unit.

8. The apparatus of claim 7, wherein said predetermined touching of said touch pad unit corresponds to a closed curve.

9. The apparatus of claim 8, said closed curve enclosing a predetermined area.

10. The apparatus of claim 1, wherein said touch pad unit detects said first, second, and third touching.

11. The apparatus of claim 1, wherein said computer system corresponds to a portable computer.

12. The apparatus of claim 1, wherein said touch pad unit is mounted adjacent to a keyboard installed at a top surface of a main body of said computer system.

13. The apparatus of claim 1, wherein said touch pad unit enables a user to control said pointer displayed on said monitor of said computer system.

14. The apparatus of claim 1, wherein said first, second, and third pointer data respectively correspond to a first, a second, and a third direction of movement of said pointer displayed on said monitor of said computer system.

15. An apparatus controlling a touch-sensitive touch pad unit coupled to a computer system, the apparatus comprising:
    a touch pad unit being coupled to a computer system, generating first and second pointer data respectively corresponding to a first and second touching of said touch pad unit, and transmitting said first and second pointer data, said second touching beginning after said first touching ends;
    an interface unit being coupled to said touch pad unit, receiving said first pointer data, transmitting a first control signal corresponding to said first pointer data, detecting a first quantity of time elapsing after said first touching ends, transmitting a second control signal corresponding to said second pointer data when said first quantity of time does not exceed a predetermined quantity of time, and not transmitting said second control signal when said first quantity of time does exceed said predetermined quantity of time; and a central processing unit being coupled to said interface unit and receiving said first control signal from said interface unit and transforming said first control signal to a pointer to be displayed at a first position on a monitor coupled to said computer system, said first position on said monitor corresponding to said first control signal.

16. The apparatus of claim 15, wherein said central processing unit receives said second control signal from said interface unit and transforms said second control signal to said pointer to be displayed at a second position on said monitor coupled to said computer system when said first quantity of time does not exceed said predetermined quantity of time, said second position on said monitor corresponding to said second control signal.

17. The apparatus of claim 15, wherein said interface unit further comprises a microprocessor and a memory storing a control routine controlling said transmitting of said first control signal.

18. The apparatus of claim 16, wherein said interface unit further comprises a pointer data buffer coupled between an output terminal of said interface unit and an input terminal of said central processing unit, said pointer data buffer storing said first control signal received from said output terminal of said interface unit.

19. The apparatus of claim 18, wherein said pointer data buffer operates in accordance with a first-in-first-out sequential structure of processing control data, said first control signal being received by said pointer data buffer from said output terminal of said interface unit prior to said second control signal being received by said pointer data buffer from said output terminal of said interface unit, and said first control signal being transmitted to said central processing unit prior to said second control signal being transmitted to said central processing unit, said control data corresponding to said first and second control signals transmitted from said output terminal of said interface unit.

20. An apparatus operating a touch-sensitive touch pad unit coupled to a computer system, the apparatus comprising:

a touch pad unit being coupled to a computer system, said touch pad unit generating first, second, and third pointer data respectively corresponding to a first, a second, and a third touching of said touch pad unit, each one of said touchings having a beginning and an end;

a switch being coupled to said touch pad unit and also to a local reference potential, controlling a transmission of said first, second, and third pointer data to said local reference potential, said switch having a first position causing said first, second, and third pointer data to be transmitted to said local reference potential, and said switch having a second position causing said first, second, and third pointer data to not be transmitted to said local reference potential;

an interface unit being coupled to said touch pad unit, receiving said first, second, and third pointer data from said touch pad unit when said switch is in said second position, transmitting a first control signal corresponding to said first pointer data from said interface unit, detecting a first quantity of time corresponding to time elapsing after said end of said first touching, not transmitting a second control signal corresponding to said second pointer data from said interface unit when said first quantity of time exceeds a predetermined quantity of time; and a central processing unit being coupled to said interface unit, receiving said first control signal from said interface unit, and transforming said first control signal to a pointer to be displayed at a first position on a monitor coupled to said computer system, said first position on said monitor corresponding to said first control signal.

21. The apparatus of claim 20, wherein said interface unit transmits said third control signal from said interface unit to said central processing unit when said first quantity of time exceeds said predetermined quantity of time and said third pointer data corresponds to predetermined pointer data.

22. The apparatus of claim 21, wherein said predetermined pointer data corresponds to a predetermined touching of said touch pad unit.

23. The apparatus of claim 22, wherein said predetermined touching of said touch pad unit corresponds to a closed curve.

24. The apparatus of claim 23, said closed curve enclosing a predetermined area.

25. The apparatus of claim 20, further comprising a keyboard being coupled to said computer system and including a plurality of keys, wherein said switch corresponds to a bypass key selected from among said plurality of keys.

26. The apparatus of claim 25, wherein said bypass key corresponds to a first key to be operated in combination with a second key, said first and second keys being selected from among said plurality of keys.

27. A method of controlling a touch-sensitive touch pad unit coupled to a computer system, comprising the steps of:

detecting whether pointer data is generated by a touch pad unit after a predetermined quantity of time has elapsed, said pointer data being generated by said touch pad unit when a user performs a second touching of said touch pad unit, said touch pad unit being coupled to a computer system, and said touch pad unit enabling a user to control a pointer displayed on a monitor coupled to said computer system, measurement of said predetermined quantity of time starting when a first touching of said touch pad unit ends;

when said pointer data is generated by said touch pad unit before said predetermined quantity of time has elapsed, transmitting a control signal corresponding to said pointer data;

when said pointer data is generated by said touch pad unit after said predetermined quantity of time has elapsed, not transmitting said control signal corresponding to said pointer data;

detecting when said pointer data corresponds to predetermined pointer data; and when said pointer data is generated by said touch pad unit after said predetermined quantity of time has elapsed and said pointer data corresponds to said predetermined pointer data, transmitting said control signal corresponding to said pointer data.

28. The method of claim 27, wherein said predetermined pointer data corresponds to a predetermined touching of said touch pad unit.

29. The method of claim 28, wherein said predetermined touching of said touch pad unit corresponds to a closed curve.

30. The method of claim 29, said closed curve enclosing a predetermined area.

31. The method of claim 27, wherein said pointer data generated by said touch pad unit is transmitted to an interface unit, said interface unit being coupled to said touch pad unit.

32. The method of claim 31, said interface unit transmitting said control signal to a central processing unit, said central processing unit being coupled to said interface unit.

33. The method of claim 32, wherein said interface unit further comprises a microprocessor and a memory storing a control routine controlling said transmitting of said control signal.

34. The method of claim 32, wherein said interface unit further comprises a pointer data buffer coupled between an output terminal of said interface unit and an input terminal of said central processing unit, said pointer data buffer storing said control signal received from said output terminal of said interface unit.

35. The method of claim 34, wherein said control signal corresponds to a plurality of control signals, and said pointer data buffer operates in accordance with a first-in-first-out sequential structure of processing control data, a first control signal of said plurality of control signals being received by said pointer data buffer from said output terminal of said interface unit prior to a second control signal of said plurality of control signals being received by said pointer data buffer from said output terminal of said interface unit, and said first control signal being transmitted to said central processing unit prior to said second control signal being transmitted to said central processing unit, said control data corresponding to said plurality of control signals transmitted from said output terminal of said interface unit.

36. The method of claim 27, wherein said predetermined quantity of time corresponds to three seconds.

* * * * *